US008625432B2

United States Patent
Hayden et al.

(10) Patent No.: US 8,625,432 B2
(45) Date of Patent: Jan. 7, 2014

(54) NETWORKS

(75) Inventors: James Hayden, Swadlincote (GB); Jonathan Oldershaw, Nottingham (GB)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 314 days.

(21) Appl. No.: 12/809,505

(22) PCT Filed: Dec. 4, 2008

(86) PCT No.: PCT/EP2008/066754
§ 371 (c)(1),
(2), (4) Date: Dec. 1, 2010

(87) PCT Pub. No.: WO2009/080456
PCT Pub. Date: Jul. 2, 2009

(65) Prior Publication Data
US 2011/0085446 A1 Apr. 14, 2011

(30) Foreign Application Priority Data
Dec. 20, 2007 (GB) ................... 0724859.4

(51) Int. Cl.
*H04L 12/26* (2006.01)
*H04J 3/14* (2006.01)

(52) U.S. Cl.
USPC .................... 370/236.2; 370/241.1

(58) Field of Classification Search
USPC ................. 370/241, 249
See application file for complete search history.

(56) References Cited

U.S. PATENT DOCUMENTS

| | | | |
|---|---|---|---|
| 6,700,871 B1 * | 3/2004 | Harper et al. ............ | 370/235 |
| 2007/0014290 A1 * | 1/2007 | Dec et al. ................ | 370/390 |
| 2007/0140126 A1 * | 6/2007 | Osswald et al. .......... | 370/236.2 |
| 2009/0003313 A1 * | 1/2009 | Busch et al. ............. | 370/352 |
| 2009/0059799 A1 * | 3/2009 | Friskney et al. .......... | 370/241.1 |
| 2012/0120809 A1 * | 5/2012 | Gero et al. .............. | 370/241.1 |

OTHER PUBLICATIONS

O. Stokes et al. OAM for L2 VPN Networks Using CFM and VCCV, Nov. 2007, L2 VPN Working Group.*
Norman Finn, Connectivity Fault Management, Jul. 2004, IEEE 802.1 Tutorial.*
Norman Finn, Connectivity Fault Management (An Update on Bridging Technologies), Jul. 2005, IEEE 802.1 Tutorial.*
Stokes et al., OAM for L2 VPN Networks Using CFM and VCCV, 2007, IETF.*
EPO, Int'l Search Report in PCT/EP2008/066754, Jul. 21, 2009.
ITU, OAM Functions and Mechanisms for Ethernet Based Networks, Draft Recommendation Y.17ethoam. Dec. 17, 2004, pp. 1-99, ITU, Geneva, CH.
Fairhurst et al., Advice to Link Designers on Link Automatic Repeat reQuest (ARQ), RFC3366, Aug. 1, 2002, pp. 1-27, Internet Eng'g Task Force.
Yang et al., A Cooperative Failure Detection Mechanism for Overlay Multicast, J. Parallel and Distributed Computing, May 2, 2007, pp. 635-647, vol. 67, No. 6, Elsevier, Amsterdam, NL.
Takacs et al., GMPLS RSVP-TE Ethernet OAM Extensions, May 11, 2007, Internet Eng'g Task Force.

* cited by examiner

*Primary Examiner* — Marcus R Smith
(74) *Attorney, Agent, or Firm* — Potomac Patent Group PLLC

(57) ABSTRACT

A network includes a number of nodes interconnected by communication links. The nodes include pairs of nodes configured as maintenance end points. Each maintenance end point of each pair is configured to transmit continuity check messages to the other maintenance end point of the pair. Each maintenance end point is arranged to transmit a continuity check message according to a schedule such that an impact of transmission of the continuity check message on the network resources is reduced.

20 Claims, 5 Drawing Sheets

```
Time   0s          1s          2s          3s          4s
Ex. 1  MEP1 MEP2   MEP1 MEP2   MEP1 MEP2   MEP1 MEP2
           MEP1 MEP2   MEP1 MEP2   MEP1 MEP2       MEP1 MEP2 ..........

Ex. 2  MEP1 MEP2 MEP3 MEP4 MEP1 MEP2 MEP3 MEP4 MEP1 MEP2 MEP3 MEP4 MEP1 MEP2
       MEP3 MEP4 MEP1 MEP2 MEP3 MEP4 MEP1 MEP2 MEP3 MEP4 MEP1 MEP2 MEP3 MEP4 ..........
```

NETWORKS

TECHNICAL FIELD

This invention concerns improvements in or relating to networks and in particular, but not exclusively, to optical networks using Ethernet, in particular OAM (Operation, Administration, Maintenance) enabled Ethernet and more particularly, in accordance with the ITU Y.1731 Ethoam standard.

DETAILED DESCRIPTION

Figure 1:
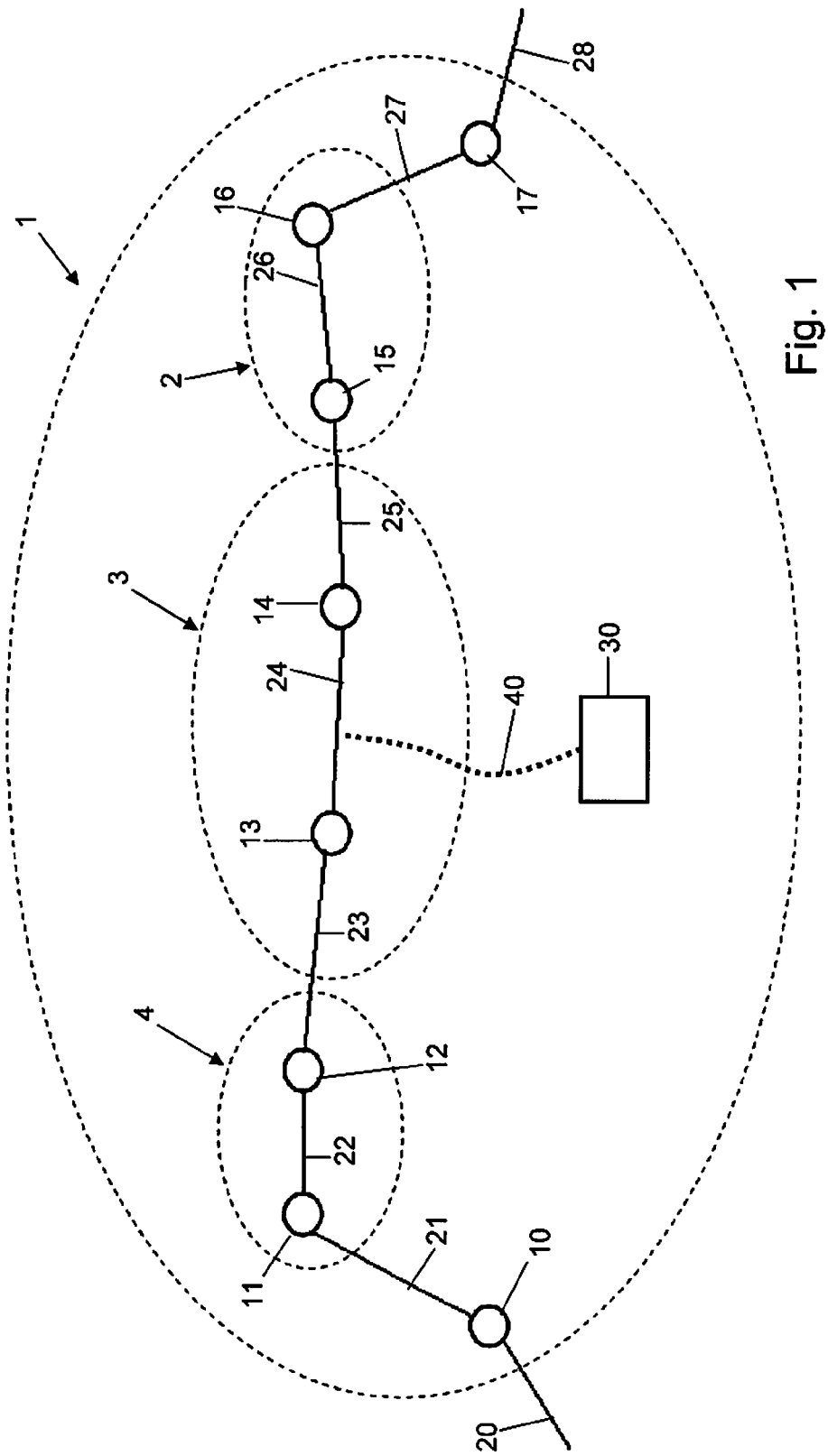
FIG. 1 is a diagrammatic view of an embodiment of a network in accordance with the invention.
Figure 2:
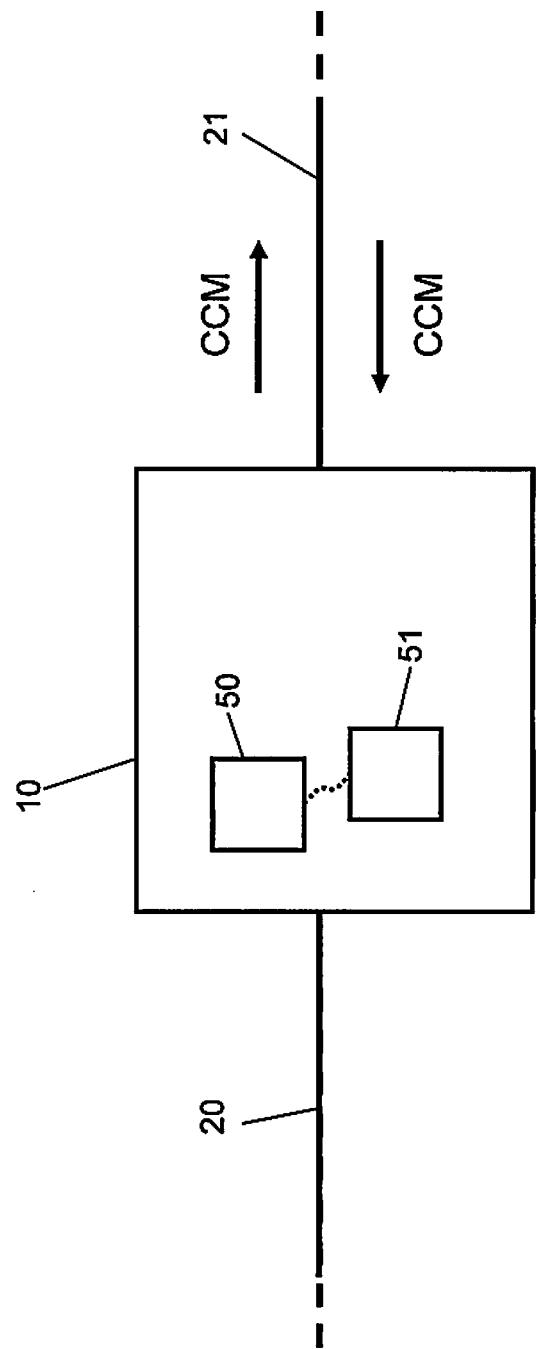
FIG. 2 is a diagrammatic view of an embodiment of a maintenance end point in accordance with the invention.

Referring to FIGS. 1 and 2, a network according to an embodiment of the invention comprises a plurality of nodes 10 to 17 interconnected by communication links 20 to 28, such as fibre optic cables. The network uses Ethernet, in particular OAM (Operation, Administration, Maintenance) enabled Ethernet in accordance with the ITU Y.1731 Ethoam standard.

The plurality of nodes 10 to 17 comprise pairs of nodes 10 and 17, 11 and 12, 13 and 14 and 15 and 16 configured as maintenance end points (MEPs). Each MEP 10 to 17 of each pair transmits continuity check messages (CCMs) to the other MEP 10 to 17 of the pair. The CCMs are dedicated messages used for checking that the network is working, for example, each MEP 10 to 17 may be able to determine faults in the network as a result of the absence of an expected CCM or from data contained in the CCM.

The network may be divided into sections 1 to 4 of the network (as indicated by the dotted lines) and each section 1 to 4 may be controlled/maintained by different operators. Each section 1 to 4 of the network may comprise one or more pairs of MEPs that the operator can use to determine whether that section 1 to 4 of the network is operating as it should be. In some instances, one operator may have some control/maintenance responsibilities over a section of the network that encompass other sections of the network controlled/maintained by other operators (in this instance section 1 includes sections 2 to 4). MEPs that operate for sections of the network that encompass other sections having dedicated MEPs are said to operate on a higher level and the CCMs sent by MEPs of the higher level sections pass through MEPs of lower level sections. For example, CCMs sent by MEPs 10, 17 pass through MEPs 11 to 16. The operator of higher level section 1 considers MEPs 11 to 16 to be maintenance intermediate points (MIPs). MIPs 11 to 16 do not initiate CCMs that are sent to MEPs 10, 17 that operate on a higher level but can listen to the higher level CCMs that pass therethrough.

Referring to FIG. 2, each MEP 10 to 17 comprises a processor 50 and memory 51 and can be programmed (configured) to operate as desired.

The network may also comprise a management system 30 for configuring and controlling the MEPs 10 to 17. In this embodiment, the management system 30 is shown as a single device and communicates with the MEPs along the communication links 40 and 20 to 28. It will be understood however that the management system may comprise more than one device and may communicate with the MEPs over a dedicated communication link.

In accordance with the invention, each MEP 10 to 17 is arranged to transmit a CCM in accordance with a schedule such that an impact of transmission of the CCMs on network resources is reduced. In particular, to reduce network traffic at any one instant as a result of the transmission of CCMs, each MEP 10 to 17 is configured to transmit a CCM at a different time to the transmission of a CCM by another of the MEPs 10 to 17. Ideally, the transmission of CCMs by the MEPs 10 to 17 should be scheduled such that, as far as possible, the times of transmission of CCMs by the MEPs 10 to 17 are evenly distributed.

Figure 3:
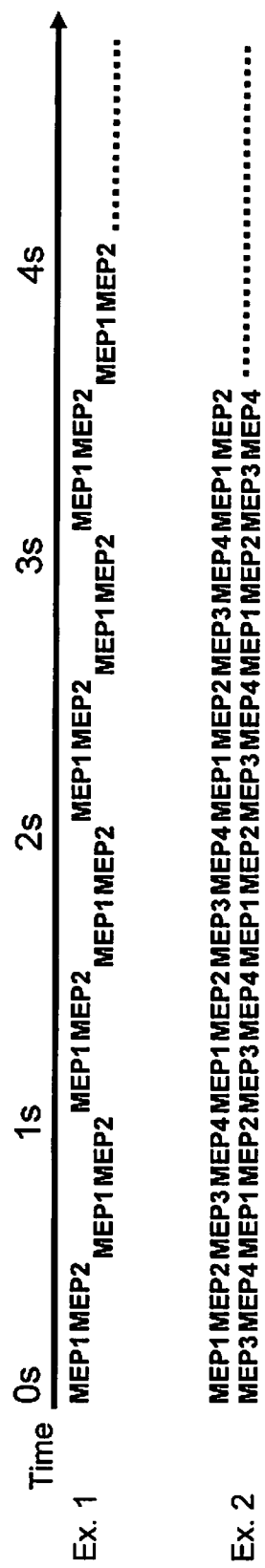
FIG. 3 is a timeline of two schedules in accordance with the invention.

FIG. 3 illustrates two examples of schedules for the transmission of CCMs in accordance with the invention. The first example is for a network comprising two pairs of MEPs, 1 and 2. The transmission of a CCM by either one of the MEPs of pair 1 is indicated by MEP 1 and the transmission of a CCM by either one of the MEPs of pair 2 is indicated by MEP2. The top line indicates transmission of a CCM by an MEP of the pair in one direction in the network (from left to right or right to left in the network as shown in FIG. 1) and the bottom line indicates transmission of a CCM by the other MEP of the pair in the other direction. As can be seen, the MEPs are configured to transmit the CCMs in a sequence that is repeated cyclically such no one transmission of a CCM coincides with another. In this way, traffic at any instant due to transmission of CCMs is reduced.

The second example of a schedule according to the invention indicates scheduling wherein it is not possible to have a unique transmission time for each CCM. In this case, any two MEPs may transmit CCMs at the same time. In this way, the instantaneous traffic due to CCMs is kept to a minimum.

It will be understood that the above embodiment is for illustrative purposes only and in most practical situations, a network will comprise many more pairs of MEPs and the transmission time (time slice) for a CCM is likely to be much shorter. For example, in one embodiment, the cyclic period is of the order of milliseconds and is divided into a hundred or more time slices. In one embodiment, the cyclic period is 2 ms and is divided into 500 time slices.

Figure 4:
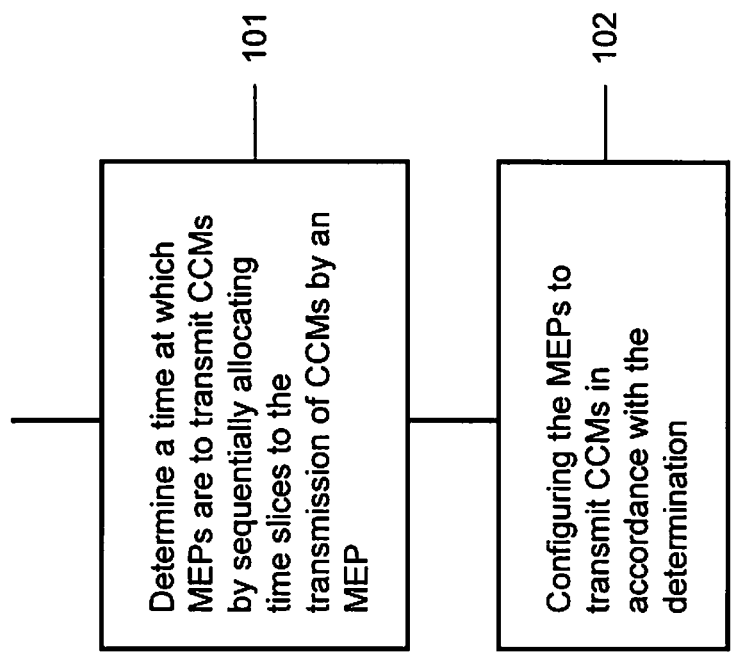
FIG. 4 is a flowchart showing a method in accordance with an embodiment of the invention.

The schedule for the MEPs may be determined and/or managed by the management system 30. The management system 30 may be programmed to determine the schedule for the transmission of CCMs by the MEPs 10 to 17 and configure the MEPs 10 to 17 in accordance with this determination. This method carried out by the management system is illustrated in FIG. 4.

Determining the schedule may comprise dividing a cyclic period, during which a sequence of CCMs are to be transmitted, into a set number of time slices, and allocating one of these time slices to the transmission of CCMs by a specified one of the MEPs 10 to 17 such that the transmission of CCMs is distributed, preferably as evenly as possible, across the cyclic period.

It will be understood that other methods of scheduling may be used in accordance with the invention such that transmission of CCMs is distributed across a cyclic period (rather than transmission of all CCMs in one cycle simultaneously).

In one embodiment, each CCM comprises sent count data on the number of data frames that have been sent from the MEP to the corresponding MEP of the pair, received count data on the number of data frames received by the MEP from the corresponding MEP of the pair and a copy of sent count data contained in the last CCM received by the MEP from the corresponding MEP of the pair.

The MEPs can use such information to calculate data frame loss. However, if a CCM message itself fails to be transmitted, this can result in the data frame loss calculated from the data contained in later received CCMs to be incorrect. In particular, the MEPs are programmed to include in a transmitted CCM a copy of sent count data contained in the last CCM received by the MEP from the corresponding MEP of the pair. In the prior art networks, an MEP has no way of knowing from the copy of sent count data contained in a received CCM whether one of its sent CCMs was lost. Therefore, the MEP has no way of knowing that the received count data does not tally with the copy of sent count data contained in a received CCM when one of its sent CCMs has been lost. Consequentially, data frame loss calculations based on such data in the received CCM may be presented as valid even though it is incorrect.

Figure 5:
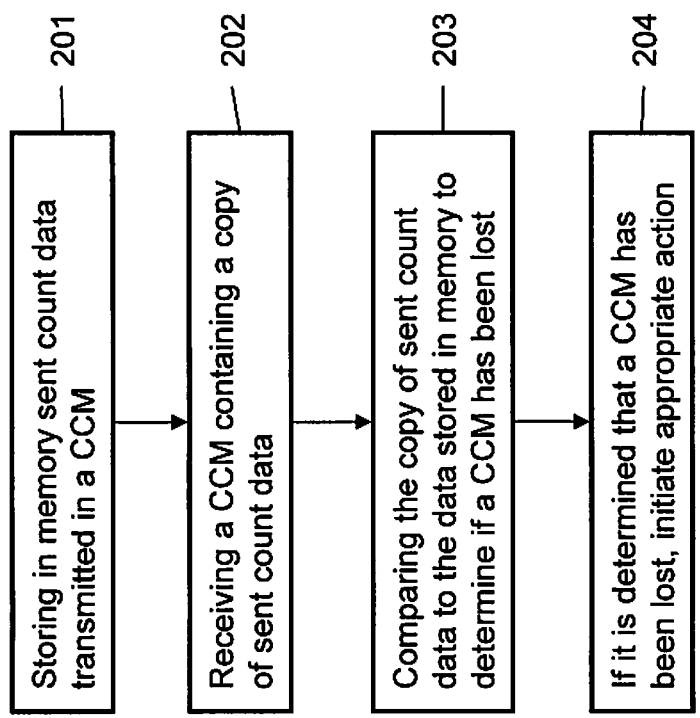
FIG. 5 is a flowchart showing a method in accordance with an embodiment of another aspect of the invention.

In accordance with one aspect of the invention, each MEP may be programmed to carry out the method shown in FIG. 5. In this method, each MEP is arranged to store in memory the sent count data contained in CCMs transmitted from the MEP and compare the stored sent count data to the copy of sent count data contained in CCMs received from the corresponding MEP of the pair to determine if a CCM was lost. For example, if there is no corresponding value of sent count data in memory to the copy of sent count data contained in the received CCM then the MEP can assume that a CCM has been lost.

In order to provide efficient processing, each MEP may be arranged to search through the stored sent count data from oldest to newest to find the oldest stored sent count data with a value equal to a value of the copy of sent count data contained in a CCM received from the corresponding MEP of the pair and that is not older than any invalidated stored count data. If such a value if found then that data entry is invalidated (marked found). However, if no entry is found before an invalidated entry, then the MEP determines that a CCM has been lost and initiates appropriate action. For example, the MEP may be programmed to generate a signal indicating that any data frame loss calculation based on data contained in that CCM is invalid.

The invention claimed is:

1. A network, comprising:
a plurality of nodes interconnected by communication links, the plurality of nodes comprising pairs of nodes configured as maintenance end points (MEPs), wherein each MEP of each pair is configured to transmit continuity check messages (CCMs) to the other MEP of the pair, and each MEP is arranged to transmit a CCM in accordance with a schedule such that an impact of transmission of CCMs on network resources is reduced, the schedule is a schedule of CCM transmissions of the MEPs, and the schedule is determined such that each MEP is arranged to cyclically transmit a CCM at a time different from times of transmission of CCMs by other MEPs during a period of the cycle.

2. The network of claim 1, wherein a cyclic period during which a sequence of CCMs is transmitted is divided into a set number of time slices, and each MEP is arranged to transmit a CCM during one of the time slices such that transmissions of CCMs by the plurality of MEPs are distributed across the cyclic period.

3. The network of claim 2, wherein each MEP is arranged to transmit a CCM during one of the time slices such that transmissions of CCMs by the plurality of MEPs are substantially evenly distributed across the cyclic period.

4. The network of claim 2, wherein the cyclic period is of the order of milliseconds (ms) and is divided into at least one hundred time slices.

5. The network of claim 4, wherein the cyclic period is two ms and is divided into 500 time slices.

6. A method of configuring a network that includes a plurality of nodes interconnected by communication links, the plurality of nodes including pairs of nodes configured as maintenance end points (MEPs), and each MEP of each pair being configured to transmit continuity check messages (CCMs) to the other MEP of the pair, the method comprising configuring each MEP to transmit a CCM in accordance with a schedule such that an impact of transmission of the CCMs on network resources is reduced, wherein the schedule is a schedule of CCM transmissions of the MEPs, and the schedule is determined such that each MEP is configured to cyclically transmit a CCM at a time different from times of transmission of CCMs by other MEPs during a period of the cycle.

7. The method of claim 6, wherein a cyclic period during which a sequence of CCMs is transmitted is divided into a set number of time slices, and each MEP is configured to transmit a CCM during one of the time slices such that transmissions of CCMs by the plurality of MEPs are distributed across the cyclic period.

8. The method of claim 7, wherein each MEP is configured to transmit a CCM during one of the time slices such that transmissions of CCMs by the plurality of MEPs are substantially evenly distributed across the cyclic period.

9. The method of claim 7, wherein the cyclic period is of the order of milliseconds (ms) and is divided into at least one hundred time slices.

10. The method of claim 9, wherein the cyclic period is two ms and is divided into 500 time slices.

11. A method of determining a time at which maintenance end points (MEPs) of a network transmit continuity check messages (CCMs), comprising:
dividing a prescribed time period into a set number of time slices; and
sequentially allocating time slices to transmissions of CCMs by MEPs according to a schedule until all MEPs have been allocated a time for transmission of a CCM during the prescribed time period;
wherein each MEP is allocated a different time for transmission of a CCM unless all time slices have been allocated, whereupon more than one transmission of a CCM by a MEP is allocated to each time slice; and the schedule is a schedule of CCM transmissions of the MEPs.

12. A management system for a network having a plurality of nodes interconnected by communication links, the plurality of nodes including pairs of nodes configured as maintenance end points (MEPs) that transmit continuity check messages (CCMs) to each other, wherein the management system, when connected in the network, is arranged to control each MEP to cyclically transmit a CCM in accordance with a schedule such that an impact of transmission of the CCMs on network resources is reduced, the schedule is a schedule of CCM transmissions of the MEPs, and the schedule is determined such that each MEP transmits a CCM at a time different from times of transmission of CCMs by other MEPs during a period of the cycle.

13. A non-transitory computer-readable medium having stored instructions that, when executed by a computer in a network having a plurality of nodes interconnected by communication links, the plurality of nodes including pairs of nodes configured as maintenance end points (MEPs) that transmit continuity check messages (CCMs) to each other, cause each MEP to cyclically transmit a CCM in accordance with a schedule such that an impact of transmission of the CCMs on network resources is reduced, the schedule is a schedule of CCM transmissions of the MEPs, and the schedule is determined such that each MEP transmits a CCM at a time different from times of transmission of CCMs by other MEPs during a period of the cycle.

14. A network node for a network having a plurality of nodes interconnected by communication links, the plurality of nodes including pairs of nodes configured as maintenance end points, the network node comprising a processor and a memory configured to work as a maintenance end point pairwise with a second maintenance end point and to transmit continuity check messages to the second maintenance end point, wherein the network node is arranged to cyclically transmit the continuity check messages in accordance with a schedule such that an impact of transmission of the continuity check messages on network resources is reduced, the schedule is a schedule of continuity check message transmissions of the network nodes, and the schedule is determined such that the network node is arranged to transmit a continuity check message at a time different from a time of transmission of a continuity check message by the second maintenance end point during a period of the cycle.

15. A network, comprising:
a plurality of nodes interconnected by communication links, the plurality of nodes comprising pairs of nodes configured as maintenance end points (MEPs) that transmit continuity check messages (CCMs) to each other, each CCM comprising sent count data on a number of data frames that have been sent from a MEP to the other MEP of the pair, received count data on a number of data frames received by the MEP from the other MEP of the pair, and a copy of sent count data contained in a last CCM received by the MEP from the other MEP of the pair, wherein each MEP is arranged to store in memory the sent count data and to compare stored sent count data to the copy of sent count data contained in CCMs received from the other MEP of the pair to determine if a CCM was lost, each MEP cyclically transmits a CCM in accordance with a schedule that is a schedule of CCM transmissions of the MEPs, and the schedule is determined such that each MEP transmits a CCM at a time different from times of transmission of CCMs by other MEPs during a period of the cycle.

16. The network of claim 15, wherein each MEP is arranged to invalidate stored sent count data when a CCM is received from the other MEP of the pair that contains a copy of sent count data that is equal in value to the stored sent count data.

17. The network of claim 16, wherein each MEP is arranged to search through stored sent count data from oldest to newest to find oldest stored sent count data with a value equal to a value of the copy of sent count data contained in a CCM received from the other MEP of the pair and to invalidate that stored sent count data and any older stored sent count data.

18. The network of claim 16, wherein each MEP is arranged to search through stored sent count data from newest to oldest until either an invalidated stored sent count data or oldest stored sent count data with a value equal to a value of the copy of sent count data contained in a CCM received from the other MEP of the pair is found, and to invalidate the oldest stored sent count data if oldest stored sent count data with a value equal to a value of the copy of sent count data contained in a CCM received from the other MEP of the pair is found.

19. The network of claim 15, wherein in response to determination that a CCM was lost, the MEP generates a signal indicating that a data frame loss calculation based on data contained in the CCM lost is invalid.

20. A maintenance end point (MEP) for a network having a plurality of nodes interconnected by communication links, the plurality of nodes comprising pairs of nodes configured as MEPs that transmit continuity check messages (CCMs) to each other, each CCM including sent count data on a number of data frames that have been sent from a MEP to the other MEP of the pair, received count data on a number of data frames received by the MEP from the other MEP of the pair, and a copy of sent count data contained in a last CCM received by the MEP from the other MEP of the pair, wherein each MEP is arranged to store in memory the sent count data and to compare stored sent count data to the copy of sent count data contained in a CCM received from the other MEP of the pair to determine if a CCM was lost, each MEP cyclically transmits a CCM in accordance with a schedule that is a schedule of CCM transmissions of the MEPs, and the schedule is determined such that the MEP transmits a CCM at a time different from times of transmission of CCMs by other MEPs during a period of the cycle.

* * * * *